United States Patent [19]

Cho

[11] Patent Number: 5,432,914
[45] Date of Patent: Jul. 11, 1995

[54] SCANNER INTERFACE SYSTEM FOR TRANSFERRING DATA TO MAIN AND SECONDARY PROCESSING UNITS

[75] Inventor: Mun H. Cho, Kyungki-Do, Rep. of Korea

[73] Assignee: Goldstar Co., Ltd., Seoul, Rep. of Korea

[21] Appl. No.: 703,481

[22] Filed: May 21, 1991

[30] Foreign Application Priority Data

May 22, 1990 [KR] Rep. of Korea ................. 7360/1990

[51] Int. Cl.⁶ .......................................... G06F 13/00
[52] U.S. Cl. .................... 395/325; 358/401; 358/474; 364/DIG. 1; 364/DIG. 2; 364/932.62; 364/927.99; 395/275
[58] Field of Search ............. 358/400, 401, 402, 403, 358/425, 474; 395/200, 650, 275, 325

[56] References Cited

U.S. PATENT DOCUMENTS

| | | |
|---|---|---|
| 3,558,811 | 1/1971 | Montevecchio et al. |
| 4,866,535 | 9/1989 | Kubota et al. ........... 358/474 |
| 4,992,884 | 2/1991 | Sakata ..................... 358/401 |
| 5,019,916 | 5/1991 | Ogura ..................... 358/401 |
| 5,038,298 | 8/1991 | Matsumoto et al. ..... 395/148 |
| 5,060,080 | 10/1991 | Hwang .................... 358/401 |
| 5,153,746 | 10/1992 | Satoh ...................... 358/401 |
| 5,167,021 | 11/1992 | Needham ................. 395/275 |

OTHER PUBLICATIONS

1982 International Zurich Seminar On Digital Communication, Man–Machine Interaction, Mar. 9–11, 1982, Zurich Switzerland pp. 93–100.

*Primary Examiner*—Ken S. Kim
*Attorney, Agent, or Firm*—Rosen, Dainow & Jacobs

[57] ABSTRACT

A document data input system for a scanner capable of storing scanner data to another buffer memory of a microprocessor when applying the scanned data to a host computer. The document data input system comprises a host computer for storing scanned data to its internal hard disk, a scanner for scanning the document data, a scanner interface unit for interfacing between the host computer and the scanner, a microprocessor associated with a global memory and a local memory, and an interface unit for latching the data from the scanner interface unit and applying the data to the microprocessor, and applying a completion signal to the scanner interface unit when the data input to the microprocessor is completed.

3 Claims, 2 Drawing Sheets

SCANNER INTERFACE SYSTEM FOR TRANSFERRING DATA TO MAIN AND SECONDARY PROCESSING UNITS

BACKGROUND OF THE INVENTION

The present invention relates to a document data input system which receives data scanned at a scanner and stores the scanned data in a hard disk of a host computer, and more particularly to a document data input system for a scanner which is designed to be suitably used for a document acknowledgement system comprising a multiprocessor.

A conventional scanner interface, which is shown in FIG. 1, comprises a host computer 10 which receives data scanned at a scanner 12 via a scanner interface unit 11 and then stores the data in its internal hard disk.

In such a conventional system, the host computer 10 sets the mode of the scanner interface unit 11 by means of a register value and receives data scanned by the scanner 12 as an input via the scanner interface unit 11, and then stores the inputted data to a hard disk. Thereafter, the data stored in the hard disk are processed by the host computer 10 in accordance with the user's intention.

However, in such a conventional system there has been the drawback that since the scanned data is stored only in the hard disk of the host computer, the data stored in the hard disk should be transmitted from the host computer to another processor in case that the data is needed by the other processor, and it takes time to transmit the data at the host computer, causing the processing efficiency to be lowered.

SUMMARY OF THE INVENTION

Therefore, it is an object of the present invention to provide a document data input system for a scanner which can input the data scanned at the scanner to another microprocessor and store the data scanned to a buffer memory when inputting the scanned data to a host computer and storing to its hard disk.

The object of the present invention is attained by providing a document data input system which is constituted such that data transmitted from a host computer is applied to a scanner via an interface unit upon the control of the host computer, data scanned at the scanner is applied via the interface unit to the host computer by a read control signal of the host computer and then latched at a latch, and the latched data are read by the microprocessor and thereafter a completion signal is applied to the scanner.

BRIEF DESCRIPTION OF THE DRAWINGS

The above and other objects, features and advantages of the invention will be clearly understood from the following detailed description taken in conjunction with the accompanying drawings, wherein.

DETAILED DESCRIPTION OF THE INVENTION

Figure 1:
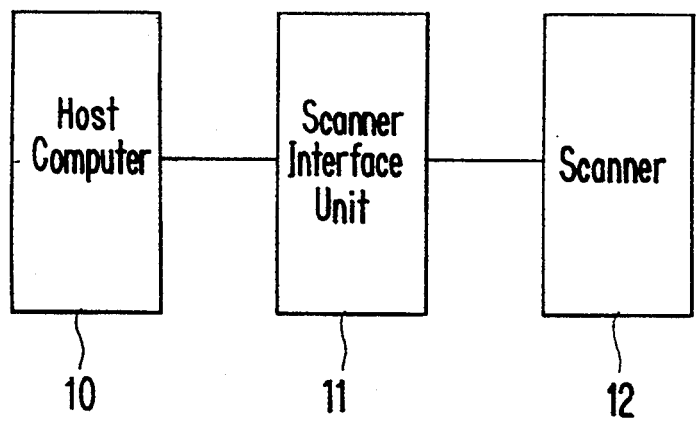
FIG. 1 is a diagram showing the configuration of a scanner interface according to a prior art system.
Figure 2:
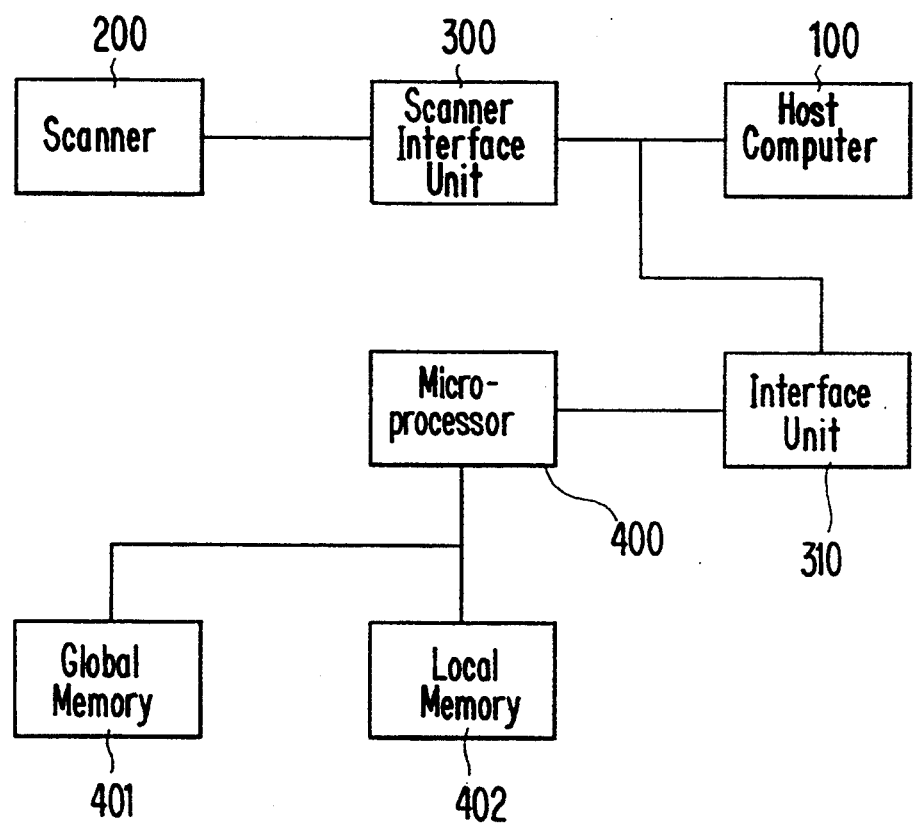
FIG. 2 a block diagram showing the configuration of a document data input system of the present invention.

Referring to FIG. 2, the document data input system according to the present invention comprises a host computer 100 for controlling the operation of the whole system and storing scanned data to its hard disk; a scanner 200 for scanning document data; a scanner interface unit 300, associated with the host computer 100 and the scanner 200, for executing an interface operation therebetween upon the control of the host computer 100; a microprocessor 400 associated with a global memory 401 and a local memory 402; and an interface unit 310 for latching scanned data passed through the scanner interface unit 300 upon the control of the host computer 100 and applying the latched data to the microprocessor 400.

Figure 3:
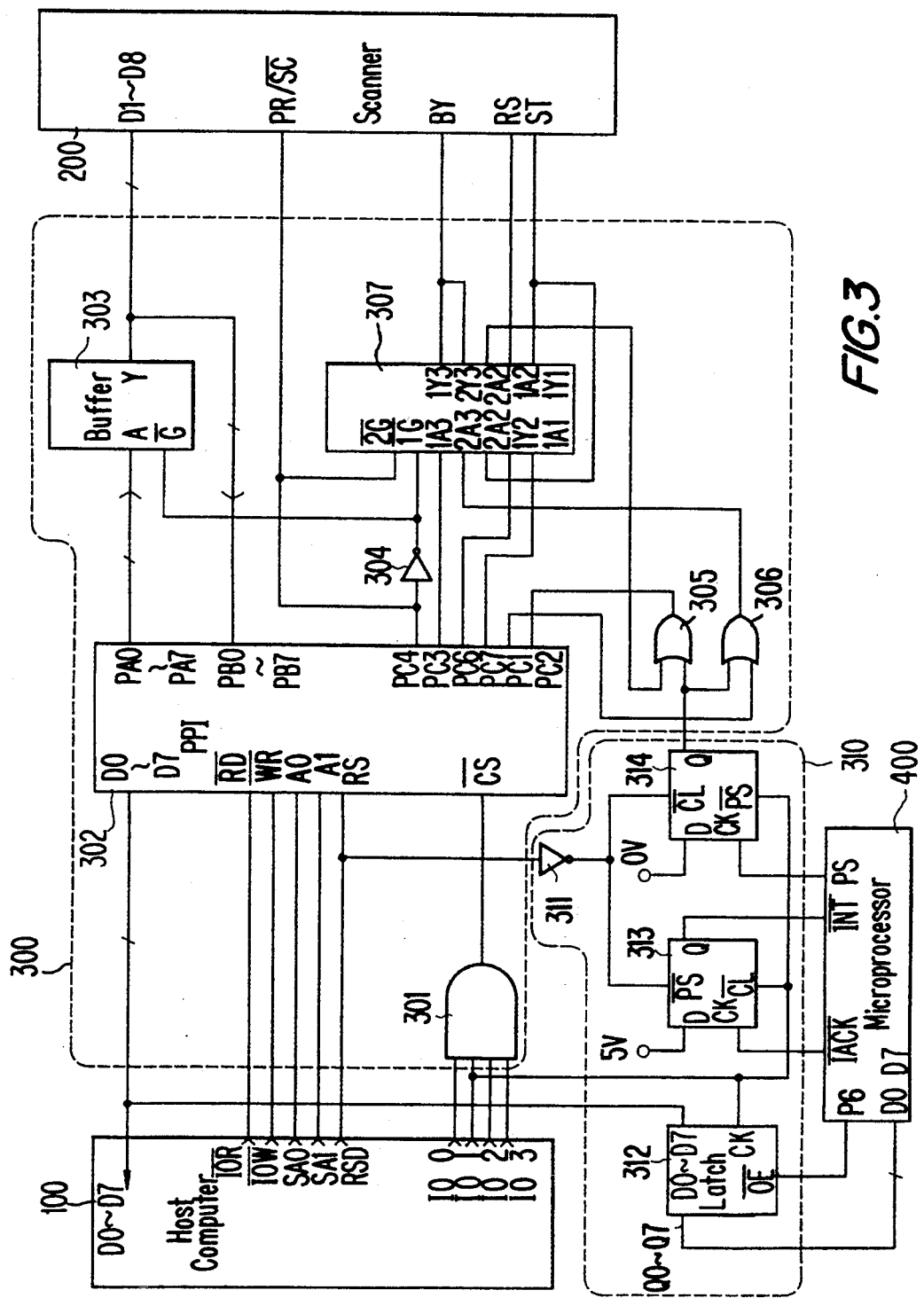
FIG. 3 is a detailed circuit diagram of the scanner interface unit of FIG. 2.

FIG. 3 shows in detail the scanner interface unit and the interface unit. As shown in FIG. 3, the scanner interface unit 300 is constituted in such a manner that data ports $D_0$–$D_7$, read control signal port $\overline{IOR}$, write control signal port $\overline{IW0}$, selection signal ports $SA_0$ and $SA_1$, and reset signal port RSD of the host computer 100 are connected respectively to data ports $D_0$–$D_7$, read port $\overline{RD}$, write port $\overline{WR}$, selection ports $A_0$ and $A_1$, and reset port RS of a scanner interface 302, and also input/output signal ports $IO_0$–$IO_3$ of the host computer 100 are connected to a chip selection port $\overline{CS}$ of the scanner interface 302 via an AND gate 301, output ports $PA_0$–$PA_7$ of the scanner interface 302 are connected via a buffer 303 to data ports $D_1$–$D_8$ of the scanner 200 and input ports $PB_0$–$PB_7$ of the scanner interface 302 are connected directly to the data ports $D_1$–$D_8$ of the scanner 200; a mode control signal port $PC_4$ of the scanner interface 302 is connected to a preset/scanner port $PR/\overline{SC}$ of the scanner 200 and an enable port $\overline{2G}$ of a multiplexer 307 as well as to an enable port $\overline{G}$ of the buffer 303 and an enable port $\overline{1G}$ of the multiplexer 307 via an inverter 304; interrupt signal port $PC_3$, acknowledge port $PC_6$, and output buffer full port $PC_7$ of the scanner interface 302 are connected to ports $1A_3$, $1Y_2$ and $1A_1$ of the multiplexer 307, input buffer full port $IC_1$ via an OR gate 306 to a port $2A_3$ of the multiplexer 307, and also ports $1Y_3$ and $2Y_3$, $1A_2$ and $1Y_1$ to ports RS and ST of the scanner 200; and then the port ST is connected to a port $2A_2$ of the multiplexer 307 and also the port $2Y_2$ via an OR gate 305 to a strobe port $PC_2$ of the scanner interface 302. In the interface unit 310 data ports $D_0$–$D_7$ of the scanner interface 302 are connected to data ports $D_0$–$D_7$ of the latch 312 and output ports $Q_0$–$Q_7$ of the latch 312 are connected to data ports $D_0$–$D_0$–$D_7$ of the microprocessor 400; input/output signal port $IO_1$ of the host computer 100 is connected to a clock port CK of the latch 312, a clear port $\overline{CL}$ of a flip-flop 313, and a preset port $\overline{PS}$ of a flip-flop 314 and also a reset signal port RSD of the host computer 100 is connected via the inverter 311 to the preset port $\overline{PS}$ of the flip-flop 313 and the clear terminal $\overline{CL}$ of the flip-flop 314; the output port Q of the flip-flop 313 is connected to an interrupt port $\overline{INT}$ of the microprocessor 400 and interrupt acknowledge signal port $\overline{IACK}$, output demand signal port $P_6$ and completion signal port $P_5$ of the microprocessor 400 are connected to the clock port CK of the flip-flop 313, the output enable port $\overline{OE}$ of the latch 312 and the clock port CK of the flip-flop 314; and the output port Q of the flip-flop 314 is connected to inputs of OR gates 305 and 306. In the above, the scanner interface 302 is a programmable peripheral interface (PPI) wherein data ports $D_0$-$D_7$ are selectively connected to its output ports $PA_0$-$PA_7$, input ports $PB_0$-$PB_7$ and control ports $PC_0$-$PC_7$ in response to signals applied to its selection ports $A_0$ and $A_1$, and the multiplexer 307 ports $1A_1$-$1A_3$ are connected to its ports $1Y_1$-$1Y_3$ when a low potential signal is applied to its enable port $\overline{1G}$ and its ports $2A_2$ and $2A_3$ are connected to its ports $2Y_2$ and $2Y_3$ when a low potential signal is applied to its enable port $\overline{2G}$.

Hereinafter, the operation and effect of the present invention will be described in detail.

When a high level reset signal is applied from the reset signal port RSD of the host computer 100 to the reset port RS of the scanner interface 302; the scanner interface 302 is reset and initialized. At this time, since the high level reset signal is inverted into a low level signal at the inverter 311, the flip-flip 313 is preset to output a high level signal from its output port Q and the flip-flop 314 is cleared to output a low level signal from its output terminal Q, whereby output signals of the OR gates 305 and 306 are determined by signals of the port $2Y_2$ of the multiplexer 307 and of the strobe port $PC_2$ of the scanner interface 302.

Under these conditions, when the host computer 100 outputs a low level mode selection control signal at its input/output signal port $IO_3$, a low level signal is outputted from the AND gate 301, thereby causing the scanner interface 302 to be enabled, and at this time the host computer 100 outputs mode data AO (Hex) through its data ports $D_0$-$D_7$ to set the scanner interface 302 to a strobe input/output mode.

Thereafter, since the host computer 100 outputs a low level signal its input/output port $IO_2$, a low level signal is outputted from the AND gate 301, thereby causing the scanner interface 302 to be enabled. And at the selection signal port $SA_0$ of the host computer 100, a low level signal is outputted and at the selection signal port $SA_1$ thereof, a high level signal is outputted, thereby the control ports $PC_0$-$PC_7$ of the scanner interface 302 are selected. At this moment, the host computer 100 outputs preset mode data at its data ports $D_0$-$D_7$ so that high level preset mode signals are outputted from the mode control signal port $PC_4$ of the scanner interface 302. The high level preset mode signal is applied to the preset/scanner port $PR/\overline{SC}$ of the scanner 200, thereby causing the scanner 200 to be a preset mode, and since the high level preset mode signal is inverted into a low level signal at the inverter 304, the buffer 303 is enabled so that the input port A thereof is connected to its output port Y, and the input ports $1A_1$-$1A_3$ of the multiplexer 307 are connected to the output ports $1Y_1$-$1Y_3$ thereof. At this time, the host computer 100 outputs a low level signal at its input/output port $IO_0$, thereby causing the scanner interface 302 to be enabled and at the selection signal ports $SA_0$ and $SA_1$ thereof, low level signals are outputted, thereby causing the output ports $PA_0$-$PA_7$ of the scanner interface 302 to be selected, and then the scanner interface 302 becomes a write state by the low level write signal being outputted from the write signal port $\overline{IOW}$ of the host computer 100.

Thus, the scanner interface 302 receives through its data ports $D_0$-$D_7$ as an input the data being outputted from the data ports $D_0$-$D_7$ of the host computer 100 and outputs them through its output ports $PA_0$-$PA_7$, and the data from the output ports $PA_0$-$PA_7$ of the scanner interface 302 are applied to the data ports $D_1$-$D_8$ of the scanner 200 through the buffer 303.

And, at the time that the low level write signal is inverted into a high level signal, low level signals are outputted from the interrupt signal port $PC_3$ and output buffer full port $PC_7$ of the scanner interface 302 and the low level signals are applied to the busy port BY and strobe port ST of the scanner 200 through the ports $1A_3$, $1Y_3$ and $1A_1$, $1Y_1$ of the multiplexer 307, thereby the scanner 200 receives and processes the data being applied to its data ports $D_1$-$D_8$.

After the data are inputted to the scanner 200, a low level interrupt acknowledge signal is outputted through its port RS and since this low level interrupt acknowledge signal is applied via ports $1A_2$ and $1Y_2$ of the multiplexer 307 to the acknowledge port $PC_6$ of the scanner interface 302, a high level signal is outputted from the interrupt signal port $PC_3$ and output buffer full port $PC_7$ thereof at the time that the low level acknowledge signal becomes a high level signal, thereby causing the scanner interface 302 to be initialized.

In this state, the host computer 100 selects the control ports $PC_0$-$PC_7$ of the scanner interface 302, as above described, to identify that the scanner 200 read the data by checking the condition of the acknowledge port $PC_6$. That is, at this time, when the acknowledge port $PC_6$ is in a high level state, it means that the scanner 200 read the data, so that the host computer 100 may record the data in the scanner interface 302.

When the host computer 100 finishes to transmitting all the data to the scanner 200 via the scanner interface 302, a low level signal is outputted from the input/output port $IO_2$ of the host computer 100, thereby causing the scanner interface 302 to be enabled, and a low level signal is outputted from the selection signal port $SA_0$ of the host computer 100 and a high level signal is outputted from the selection signal port $SA_1$ so that the control ports $PC_0$-$PC_7$ of the scanner interface 302 is selected. At this moment, scanner mode data are outputted from the data ports $D_0$-$D_7$ of the host computer 100 so that a low level scanner mode signal is outputted from the mode control signal port $PC_4$ of the scanner interface 302. This low level scanner mode signal is applied to the preset/scanner port $PR/\overline{SC}$ of the scanner 200, thereby causing the scanner 200 to be in a scanner mode, and since the low level scanner mode signal is inverted into a high level signal at the inverter 304, the buffer 303 is disabled and the multiplexer 307 is in a state that its input ports $2A_2$ and $2A_3$ are connected to the output ports $2Y_2$ and $2Y_3$ thereof.

When the scanner 200 outputs data through its data ports $D_1$-$D_8$ to the input ports $PB_0$-$PB_7$ of the scanner interface 302, a low level signal is outputted from the strobe port ST of the scanner and applied to one side input port of the OR gate 305 through the ports $2A_2$ and $2Y_2$ of the multiplexer 307 and also a low level signal is outputted from the output port Q of the flip-flop 314, so that a low level signal is outputted from the OR gate 305 and applied to the strobe port $PC_2$ of the scanner interface 302, thereby a high level signal is outputted from the input buffer full port $PC_1$ of the scanner interface 302. This high level signal is applied via the OR gate 306 and the ports $2A_3$ and $2Y_3$ of the multiplexer 307 to the busy port BY of the scanner 200 so that the scanner 200 does not transmit data. At this moment, the host computer 100 selects the control ports $PC_0$-$PC_7$ of the scanner interface 302, as described above, and checks the condition of the strobe port $PC_2$ and then reads, when the strobe port $PC_2$ is in a low level state, the data inputted in the input ports $PB_0$-$PB_7$.

That is, at this time, a low level signal is outputted from the input/output port $IO_1$ of the host computer 100, thereby causing the scanner interface 302 to be enabled, and also a high level signal is outputted from the selection signal port $SA_0$ and a low level signal is outputted from the selection signal port $SA_1$, thereby causing the input ports $PB_0$-$PB_7$ of the scanner interface 302 to be selected. At this time, the scanner interface 302 becomes a read state by the low level read signal being outputted at the read signal port $\overline{IOR}$ of the host computer 100, thereby the data inputted in the input ports $PB_0$-$PB_7$ of the scanner interface 302 are outputted through the data ports $D_0$-$D_7$ and then stored in the hard disk.

In addition, since the low level signal being outputted from the input/output port $IO_1$ of the host computer 100 is applied to the clock port CK of the latch 312 as a clock signal, the data outputted at the data ports $D_0$-$D_7$ of the scanner interface 302 are latched at the latch 312, and a low level signal outputted at the input/output port $IO_1$ of the host computer 100 causes the flip-flop 313 to be cleared so as to output a low level signal through its output port Q and the flip-flop 314 to be preset so as to output a high level signal through its output port Q.

The low level signal outputted at the output port Q of the flip-flop 313 is applied to the interrupt port $\overline{INT}$ of the microprocessor 400 as an interrupt signal, thereby the microprocessor 400 outputs a low level interrupt acknowledge signal through its interrupt acknowledge signal port $\overline{IACK}$ so that a high level signal is outputted again at the output port Q of the flip-flop 313. At this time the microprocessor 400 outputs a low level output demand signal through its output demand signal port $P_6$ so that the latch 312 is to be enabled, and then the data latched at the latch 312 is outputted through its output ports $Q_0$-$Q_7$ and applied to the data ports $D_0$-$D_7$ of the microprocessor 400. Thus the microprocessor 400 stores the data being applied to its data ports $D_0$-$D_7$ to the global memory 401 and compresses the data in accordance with the user's processing program and then stores the compressed data to the local memory 402.

After completing the processing of data at the microprocessor 400, the microprocessor 400 outputs a low level completion signal through its completion signal port $P_5$ and applies the signal to the clock port CK of the flip-flop 314. At this time, since the flip-flop 314 outputs a low level signal through its output port Q, then the scanner 200 is ready to transmit the next pixel data.

That is, while a low level signal is outputted at the input buffer full port $PC_1$ of the scanner interface 302 at the time that a low level read signal outputted at the read signal port $\overline{IOR}$ of the host computer 100 is turned to a high level signal, a high level signal is already outputted at the output port Q of the flip-flop 314 as above described, so that a high level signal is outputted from the OR gate 306 and applied continuously to the busy port BY of the scanner 200, thereby the scanner 200 can not transmit the next pixel data. Thereafter, when a low level signal is outputted at the flip-flop 314 as above described, a low level signal is outputted from the OR gate 306 and applied to the busy port BY of the scanner 200, thereby the scanner 200 then can transmit the next pixel data.

As described above in detail, in accordance with the present invention, when scanned data is stored via a scanner interface unit to a hard disk of a host computer, the scanned data is latched at a latch and stored in another microprocessor, and until the microprocessor finishes the processing of the scanned data, the scanner does not transmit the next pixel data, so that the reliability of the product and the efficiency of the host computer can be enhanced. Also, the present invention is applicable to a document acknowledge system comprising a multiprocessor.

What is claimed is:

1. A document data input system for a scanner, comprising:
   (a) a scanner for scanning document data and transmitting scanned data;
   (b) a host computer having a hard disk for receiving and storing scanned data to the hard disk;
   (c) a first scanner interface unit connected to provide a data interface between the host computer and the scanner under the control of the host computer;
   (d) a microprocessor associated with a global memory and a local memory;
   (e) a second interface unit connected to the first scanner interface unit and the host computer and to the microprocessor, said second interface unit comprising:
      (i) a latch connected to the host computer and the microprocessor for receiving from the first scanner interface unit and latching scanned data inputted to the host computer at the same time as the host computer receives the scanned data,
      (ii) a first flip-flop for producing a first signal indicating that the scanned data are transmitted to and received by the host computer and the latch, said first interface unit in response to the first signal disabling the scanner from transmitting further scanned data,
      (iii) a second flip-flop in response to the host computer and latch receiving the scanned data for producing an interrupt signal for the microprocessor for enabling the microprocessor to receive the scanned data latched in the latch,
   (f) said second interface unit under the control of the host computer for causing the latch to latch the scanned data received and under the control of the microprocessor to transmit the latched data to the microprocessor and then to apply a completion signal to the first scanner interface unit when the data input to the microprocessor is completed to cause the first scanner interface unit to enable the scanner to transmit further scanned data.

2. The document data input system for a scanner as claimed in claim 1, wherein the first scanner interface unit interconnects data ports $D_0$-$D_7$, a read control signal port $\overline{IOR}$, a write control signal port $\overline{IWO}$, selection signal ports $SA_0$ and $SA_1$, and a reset signal port RSD of the host computer, respectively, via its data ports $D_0$-$D_7$, a read port $\overline{RD}$, a write port $\overline{WR}$, selection ports $A_0$ and $A_1$, and reset port RS, and wherein input/output signal ports $IO_0$-$IO_3$ of the host computer are connected to a chip selection port CS of the first scanner interface Unit via an AND gate, output ports $PA_0$-$PA_7$ of the first scanner interface unit are connected via a buffer to data ports $D_1$-$D_8$ of the scanner, input ports $PB_0$-$PB_7$ of the first scanner interface unit are connected to the data ports $D_1$-$D_8$ of the scanner; a mode control signal port $PC_4$ of the first scanner interface unit is connected to a preset/scanner port $PR/\overline{SC}$ of the scanner and an enable port $\overline{2G}$ of a multiplexer as well as to an enable port $\overline{G}$ of buffer and an enable port $\overline{1G}$ of the multiplexer via an inverter; an interrupt signal port $PC_3$, an acknowledge port $PC_6$, and an output buffer full port $PC_7$ of the first scanner interface unit are connected to ports $1A_3$, $1Y_2$ and $1A_1$ of the multiplexer, input buffer full port $PC_1$ via an OR gate to a port $2A_3$ of the multiplexer, and also ports $1Y_3$ and $2Y_3$, $1A_2$ and $1Y_1$ to ports BY, RS and ST of the scanner; and a port ST of the scanner is connected to a port $2A_2$ of the multiplexer and also to the port $2Y_2$ via OR gate to a strobe port $PC_2$ of the first scanner interface unit.

3. The document data input system for a scanner as claimed in claim 1, wherein data ports $D_0$–$D_7$ of the host computer are connected to data ports $D_0$–$D_7$ of the latch, a reset signal port RSD of the host computer is connected via an inverter to a preset port PS of the first flip-flop and to a clear port $\overline{CL}$ of the second flip-flop, an input/output port $IO_1$ of the host computer is connected to a clock port CK of the latch, a clear port $\overline{CL}$ of the first flip-flop, and a preset port $\overline{PS}$ of the second flip-flop, an output port Q of the first flip-flop is connected to an interrupt port $\overline{INT}$ of the microprocessor, an output demand signal port $P_6$ and data ports $D_0$–$D_7$ of the microprocessor are connected respectively to an output enable port $\overline{OE}$ and output ports $Q_0$–$Q_7$ of the latch, and an interrupt acknowledge signal port $\overline{IACK}$ and a completion signal port $P_5$ of the microprocessor are connected respectively to clock ports CK and CK of the first and second flip-flops.

* * * * *